United States Patent
Tatsukawa (10) Patent No.: US 10,538,270 B2
(45) Date of Patent: Jan. 21, 2020

(54) LANE KEEP ASSIST DEVICE

(71) Applicant: DENSO CORPORATION, Kariya, Aichi-pref. (JP)

(72) Inventor: Junpei Tatsukawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/739,133

(22) PCT Filed: Jun. 22, 2016

(86) PCT No.: PCT/JP2016/068525
§ 371 (c)(1),
(2) Date: Dec. 21, 2017

(87) PCT Pub. No.: WO2016/208627
PCT Pub. Date: Dec. 29, 2016

(65) Prior Publication Data
US 2018/0154937 A1   Jun. 7, 2018

(30) Foreign Application Priority Data

Jun. 26, 2015   (JP) .................................. 2015-128886

(51) Int. Cl.
*B62D 15/02* (2006.01)
*B62D 6/10* (2006.01)
*G06K 9/00* (2006.01)

(52) U.S. Cl.
CPC ............. *B62D 15/025* (2013.01); *B62D 6/10* (2013.01); *G06K 9/00798* (2013.01)

(58) Field of Classification Search
CPC ..... B62D 15/025; B62D 6/10; G06K 9/00798
See application file for complete search history.

(56) References Cited

U.S. PATENT DOCUMENTS

2006/0142921 A1* 6/2006 Takeda ................ B60T 8/17557
701/70
2010/0228437 A1* 9/2010 Hanzawa ................ B62D 1/28
701/41

FOREIGN PATENT DOCUMENTS

JP   2013-252862 A   12/2013
JP   2016-175571       10/2016

* cited by examiner

*Primary Examiner* — Abby Y Lin
*Assistant Examiner* — Renee LaRose
(74) *Attorney, Agent, or Firm* — Knobbe, Martens, Olson & Bear, LLP (57) ABSTRACT

According to a lane keep assist electronic control unit (LKAECU), a lane recognition section recognizes a driving lane in which the own vehicle is traveling. A target trajectory generation section generates a target trajectory in which the own vehicle travels so that deviation of the own vehicle from the driving lane is suppressed. A feedforward steering angle calculation section, a feedback steering angle calculation section, a first adder, a feedforward torque calculation section, and a feedback torque calculation section calculate a demanded torque τtgt for controlling steering of the own vehicle so that the own vehicle travels along the target trajectory. When a direction of travel of the own vehicle is a direction deviating from the driving lane and the demanded torque τtgt causes steering of the own vehicle in the direction deviating from the driving lane, an output control section sets the demanded torque τtgt to a value which does not cause steering of the own vehicle in the direction deviating from the driving lane.

10 Claims, 7 Drawing Sheets

LANE KEEP ASSIST DEVICE

This application is the U.S. national phase of International Application No. PCT/JP2016/068525 filed Jun. 22, 2016 which designated the U.S. and claims priority to JP Patent Application No. 2015-128886 filed Jun. 26, 2015, the entire contents of which are hereby incorporated by reference.

TECHNICAL FIELD

The present invention relates to a lane keep assist device which keeps a state where a vehicle does not deviate from a travel lane.

BACKGROUND ART

A lane keep assist device which controls steering of a vehicle so that the vehicle does not deviate from a travel lane is known (see, for example, Patent Literature 1). When it is determined that the own vehicle is likely to deviate from the travel lane, the device sets a target trajectory in which the own vehicle needs to travel to return to the travel lane.

CITATION LIST

Patent Literature

[PTL 1] JP 2013-252862 A

SUMMARY OF THE INVENTION

Technical Problem

However, after it is determined that the own vehicle is likely to deviate from the travel lane and the target trajectory is set, when a driver of the own vehicle steers the own vehicle in a direction to avoid deviation of the own vehicle from the travel lane, a situation where the own vehicle is located inside the target trajectory in the travel lane is assumed. In such a situation, when the own vehicle is controlled to follow the target trajectory, the lane keep assist device performs control to steer the own vehicle in a direction deviating from the travel lane. Thus, when the own vehicle is about to deviate from the travel lane, the driver may have anxiety that the own vehicle is automatically steered in the direction deviating from the travel lane.

The present invention has been made in view of such a problem, and an object of the present invention is to provide a technique for reducing driver's anxiety when deviation from a travel lane is avoided.

Solution to Problem

A lane keep assist device of the present invention for achieving the above object includes travel lane recognition means, target trajectory setting means, control amount calculation means, and control amount setting means.

The travel lane recognition means recognizes a travel lane in which the own vehicle is traveling. The target trajectory setting means sets a target trajectory which is a trajectory in which the own vehicle travels so that deviation of the own vehicle from the travel lane recognized by the travel lane recognition means is suppressed. The control amount calculation means calculates an amount of steering control for controlling steering of the own vehicle so that the own vehicle travels along the target trajectory set by the target trajectory setting means. The control amount setting means sets the amount of steering control to a deviation prohibition value which does not cause steering of the own vehicle in a direction deviating from the travel lane, when a direction of travel of the own vehicle is the direction deviating from the travel lane and the amount of steering control calculated by the control amount calculation means would otherwise cause steering of the own vehicle in the direction deviating from the travel lane.

The lane keep assist device thus configured of the present invention does not output the amount of steering control which causes steering of the own vehicle in the direction deviating from the travel lane, even in a situation where a driver of the own vehicle steers the own vehicle in a direction to avoid deviation from the travel lane and this causes the own vehicle to be located inside the target trajectory in the travel lane. This allows the lane keep assist device of the present invention to suppress driver's anxiety that the own vehicle is automatically steered in the direction deviating from the travel lane. Thus, the lane keep assist device of the present invention can reduce the driver's anxiety when deviation from the travel lane is avoided.

DESCRIPTION OF THE EMBODIMENTS

First Embodiment

The following description discusses a first embodiment of the present invention with reference to the drawings.

Figure 1:
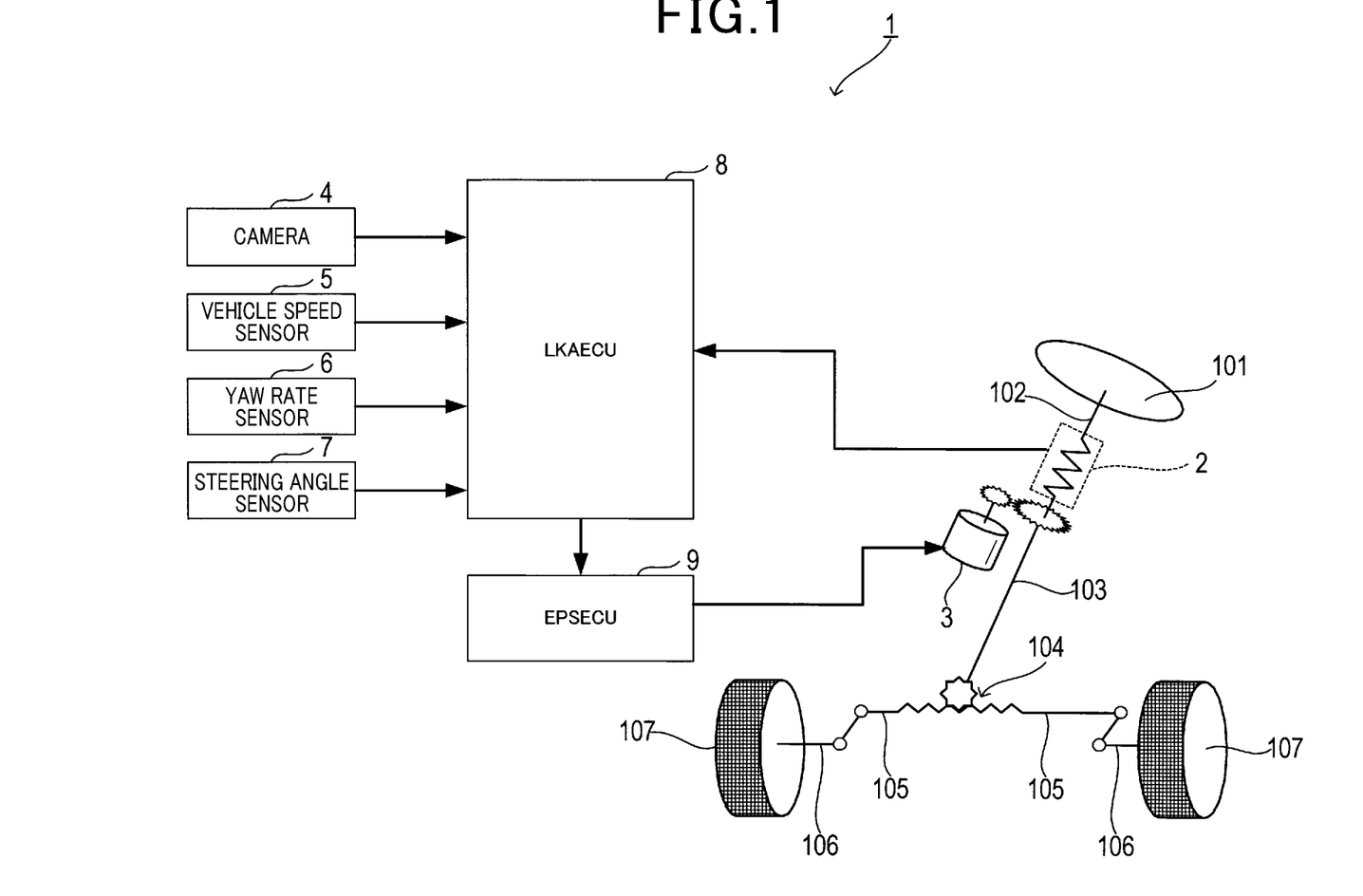
FIG. 1 is a view showing a schematic structure of a travel assist system 1.

As shown in FIG. 1, a travel assist system 1 of the present embodiment is mounted in a vehicle and includes a torque sensor 2, a motor 3, a camera 4, a vehicle speed sensor 5, a yaw rate sensor 6, a steering angle sensor 7, a lane keep assist electronic control unit 8, and an electric power steering electronic control unit 9. In the following description, the lane keep assist electronic control unit 8 is referred to as LKAECU 8. The electric power steering electronic control unit 9 is referred to as EPSECU 9. The vehicle equipped with the travel assist system 1 is referred to as own vehicle.

When the own vehicle is likely to deviate from a lane, the travel assist system 1 performs control for avoiding the deviation.

A steering wheel 101 of the own vehicle is fixed to a first end of a steering shaft 102. A first end of the torque sensor 2 is fixed to a second end of the steering shaft 102, and a second end of the torque sensor 2 is fixed to a first end of an intermediate shaft 103.

The torque sensor 2 is a sensor for detecting steering torque. Specifically, the torque sensor 2 includes a torsion bar connecting the steering shaft 102 to the intermediate shaft 103 and on the basis of a torsion angle of the torsion bar, the torque sensor 2 detects torque applied to the torsion bar.

The motor 3 includes a worm gear at an end of a rotating shaft of the motor 3. The worm gear is engaged with a worm wheel mounted on the intermediate shaft 103. This causes rotation of the motor 3 to be transmitted to the intermediate shaft 103.

A second end of the intermediate shaft 103 is connected to a steering gearbox 104. The steering gearbox 104 is constituted by a gear mechanism made of a rack and a pinion gear. Teeth of the rack are engaged with the pinion gear mounted at the second end of the intermediate shaft 103. Accordingly, when a driver turns the steering wheel 101, the intermediate shaft 103 rotates (i.e., the pinion gear rotates), and this causes the rack to move left and right. At respective both ends of the rack, tie rods 105 are mounted and perform a reciprocating motion in a left-right direction together with the rack. Thus, the tie rods 105 pull and push knuckle arms 106 provided at respective ends of the tie rods 105, and this causes directions of respective tires 107 to be changed.

The camera 4 (not shown in detail) is mounted on a front side of the own vehicle. The camera 4 repeatedly captures a road surface ahead of the own vehicle and outputs image data indicating a captured image.

The vehicle speed sensor 5 detects a travel speed of the own vehicle and outputs a vehicle speed signal indicating a result of the detection. The yaw rate sensor 6 detects a yaw rate of the own vehicle and outputs a yaw rate signal indicating a result of the detection. The steering angle sensor 7 detects a steering angle of the own vehicle and outputs a steering angle signal indicating a result of the detection.

The LKAECU 8 is mainly constituted by a well-known microcomputer made of a CPU, a ROM, a RAM, I/O, a bus line connecting these components, and the like. With use of a temporary storage function of the RAM, the CPU performs various processes on the basis of a program stored in non-transitory tangible storage media such as ROM. The LKAECU 8 performs calculation for avoiding deviation of the own vehicle from the lane, on the basis of information inputted from the torque sensor 2, the camera 4, the vehicle speed sensor 5, the yaw rate sensor 6, and the steering angle sensor 7. On the basis of a result of the calculation, the LKAECU 8 outputs, to the EPSECU 9, demanded torque $\tau_{tgt}$ indicating torque that the LKAECU 8 demands from the motor 3.

The EPSECU 9 is mainly constituted by a well-known microcomputer made of a CPU, a ROM, a RAM, I/O, a bus line connecting these components, and the like. With use of a temporary storage function of the RAM, the CPU performs various processes on the basis of a program stored in non-transitory tangible storage media such as ROM. The EPSECU 9 causes the motor 3 to generate power for steering both of the tires 107 by applying to the motor 3 a drive voltage in accordance with the demanded torque $\tau_{tgt}$ from the LKAECU 8.

Figure 2:
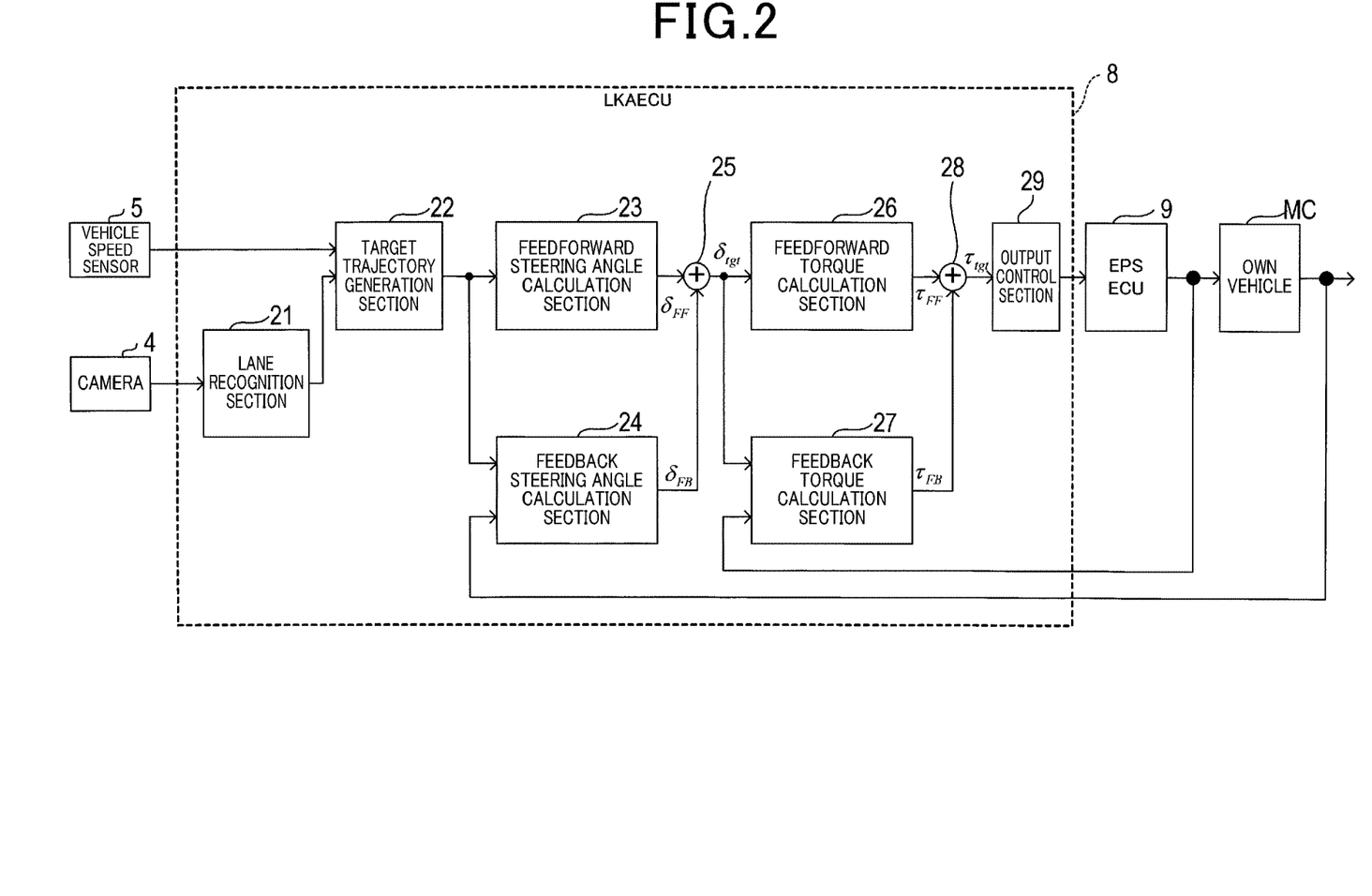
FIG. 2 is a block diagram showing a flow of a process performed by an LKAECU.

As shown in FIG. 2, the LKAECU 8 includes a lane recognition section 21, a target trajectory generation section 22, a feedforward steering angle calculation section 23, a feedback steering angle calculation section 24, a first adder 25, a feedforward torque calculation section 26, a feedback torque calculation section 27, a second adder 28, and an output control section 29.

By image processing of the image data inputted from the camera 4, the lane recognition section 21 recognizes a white line which divides into left and right sides a driving lane in which the own vehicle is traveling. The lane recognition section 21 then calculates a lateral position, a lateral speed, and a deviation angle of the own vehicle on the basis of a position at which the white line is shown in the image data. The lateral position of the own vehicle is a position of the own vehicle in the driving lane along a direction perpendicular to a direction in which the driving lane extends. The lateral speed of the own vehicle is a movement speed of the own vehicle along the direction perpendicular to the direction in which the driving lane extends. The deviation angle is an angle at which a direction of travel of the own vehicle is shifted with respect to the direction in which the driving lane extends.

The target trajectory generation section 22 determines whether the own vehicle deviates from the driving lane, on the basis of the position of the white line recognized by the lane recognition section 21, the lateral position and the deviation angle of the own vehicle calculated by the lane recognition section 21, and the vehicle speed signal inputted from the vehicle speed sensor 5. When the target trajectory generation section 22 determines that the own vehicle deviates from the driving lane, the target trajectory generation section 22 starts generating target trajectory data on the basis of the lateral position and the deviation angle calculated by the lane recognition section 21 and a vehicle speed specified by the vehicle speed signal from the vehicle speed sensor 5.

Figure 3:
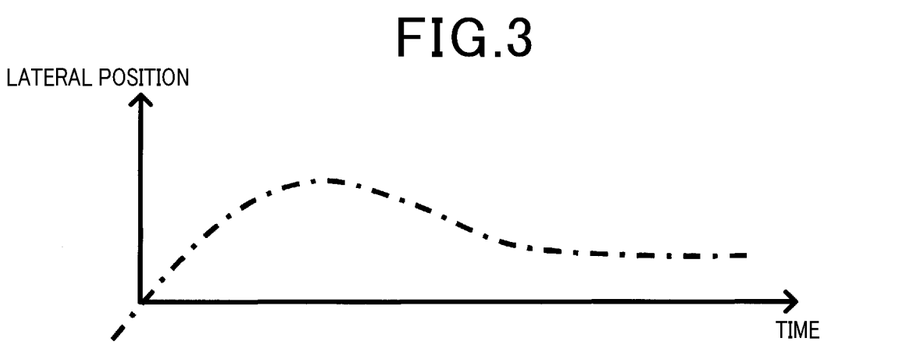
FIG. 3 is a view showing a target trajectory.

As shown in FIG. 3, the target trajectory is a trajectory which is set so that the direction of travel of the own vehicle is gradually changed from an outer side of the driving lane toward a center of the driving lane and the own vehicle eventually travels in a center of the driving lane. The target trajectory data includes a plurality of time periods based on a current time point, lateral positions indicating target trajectories corresponding to the respective plurality of time periods, a plurality of lateral speeds calculated corresponding to the respective plurality of lateral positions, and a plurality of rates of lateral acceleration calculated corresponding to the respective plurality of lateral positions. As shown in FIG. 2, the target trajectory generation section 22 outputs the lateral position, the lateral speed, and the lateral acceleration which constitute the target trajectory data to the feedforward steering angle calculation section 23 and the feedback steering angle calculation section 24.

On the basis of an arithmetic expression indicating a relationship between the lateral acceleration and the steering angle, the feedforward steering angle calculation section 23 calculates a steering angle when the lateral acceleration outputted from the target trajectory generation section 22 acts on the own vehicle. The feedforward steering angle calculation section 23 then outputs the steering angle as a feedforward steering angle $\delta_{FF}$.

The feedback steering angle calculation section 24 calculates a feedback steering angle $\delta_{FB}$ for performing feedback control so that a lateral position, a lateral speed, and lateral acceleration of the own vehicle MC coincide with the lateral position, the lateral speed, and the lateral acceleration inputted from the target trajectory generation section 22, respectively. The feedback steering angle calculation section 24 then outputs the feedback steering angle $\delta_{FB}$. The lateral position and the lateral speed of the own vehicle MC are calculated by the lane recognition section 21. The lateral acceleration of the own vehicle MC is calculated on the basis of the yaw rate detected by the yaw rate sensor 6 and the vehicle speed detected by the vehicle speed sensor 5.

The first adder 25 outputs, as a demanded steering angle $\delta_{tgt}$, an additional value obtained by adding the feedforward steering angle $\delta_{FF}$ outputted from the feedforward steering angle calculation section 23 to the feedback steering angle $\delta_{FB}$ outputted from the feedback steering angle calculation section 24.

The feedforward torque calculation section 26 converts the demanded steering angle $\delta_{tgt}$ outputted from the first adder 25 into torque and outputs the torque as feedforward torque $\tau_{FF}$. A relationship between the lateral acceleration and the torque (hereinafter referred to as lateral acceleration-torque conversion relationship) has been obtained in advance from vehicle specifications. The feedforward torque calculation section 26 calculates torque corresponding to the demanded steering angle $\delta_{tgt}$ on the basis of the lateral acceleration-torque conversion relationship and lateral acceleration corresponding to the demanded steering angle $\delta_{tgt}$. The lateral acceleration corresponding to the demanded steering angle $\delta_{tgt}$ is calculated by an arithmetic expression indicating a relationship between the lateral acceleration and the steering angle.

The feedback torque calculation section 27 calculates feedback torque $\tau_{FB}$ for performing feedback control so that the steering angle detected by the steering angle sensor 7 coincides with the demanded steering angle $\delta_{tgt}$ outputted from the first adder 25. The feedback torque calculation section 27 then outputs the feedback torque $\tau_{FB}$.

The second adder 28 outputs, to the output control section 29 as the demanded torque $\tau_{tgt}$, an additional value obtained by adding the feedforward torque $\tau_{FF}$ outputted from the feedforward torque calculation section 26 to the feedback torque $\tau_{FB}$ outputted from the feedback torque calculation section 27.

The output control section 29 controls output, to the EPSECU 9, of the demanded torque $\tau_{tgt}$ outputted from the second adder 28.

The EPSECU 9 controls the motor 3 on the basis of the demanded torque $\tau_{tgt}$ outputted from the output control section 29.

The following description discusses an output control process performed by the output control section 29. The output control process is a process repeatedly performed during operation of the LKAECU 8.

Figure 4:
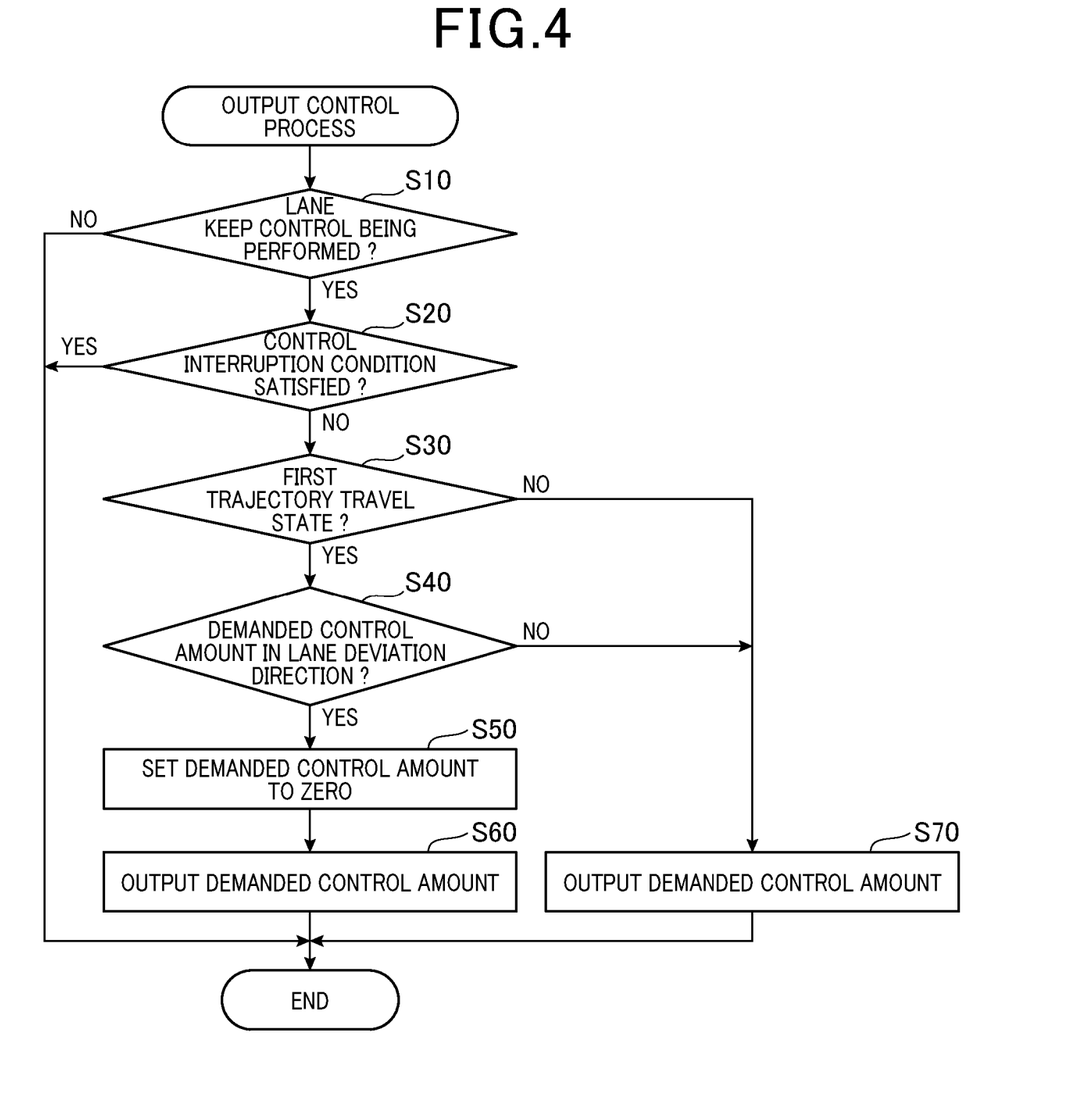
FIG. 4 is a flow chart showing an output control process of a first embodiment.

When the output control process is performed, as shown in FIG. 4, the CPU of the LKAECU 8 first in S10 determines whether lane keep control is being performed. Specifically, during a time period between a time point when the target trajectory generation section 22 determines that the own vehicle deviates from the driving lane and a time point when the own vehicle returns to the driving lane (see a time period Tc in FIG. 5), the CPU of the LKAECU 8 determines that the lane keep control is being performed.

When the lane keep control is not being performed (NO at S10), the output control process ends once. Meanwhile, when the lane keeping control is being performed (YES at S10), it is determined in S20 whether a control interruption condition which has been set in advance is satisfied. The control interruption condition is satisfied when at least one of the following four interruption conditions is satisfied. A first interruption condition is that the lane recognition section 21 cannot recognize a white line in the image data. A second interruption condition is that the vehicle speed is less than a vehicle speed for interruption determination which has been set in advance (e.g., 40 km/m according to the present embodiment). A third interruption condition is that the steering torque detected by the torque sensor 2 is not less than torque for interruption determination which has been set in advance. A fourth interruption condition is that a turn signal has been activated.

When the control interruption condition is satisfied (YES at S20), the output control process ends once. Meanwhile, when the control interruption condition is not satisfied (NO at S20), it is determined in S30 whether the own vehicle is in a first trajectory travel state. The first trajectory travel state is a state where the direction of travel of the own vehicle is a direction deviating from the driving lane (see a time period T1 in FIG. 5). A second trajectory travel state is a state where the direction of travel of the own vehicle is a direction returning to the driving lane (see a time period T2 in FIG. 5). Specifically, when the lateral acceleration calculated on the basis of the yaw rate detected by the yaw rate sensor 6 and the vehicle speed detected by the vehicle speed sensor 5 is not zero, it is determined that the own vehicle is in the first trajectory travel state.

Figure 5:
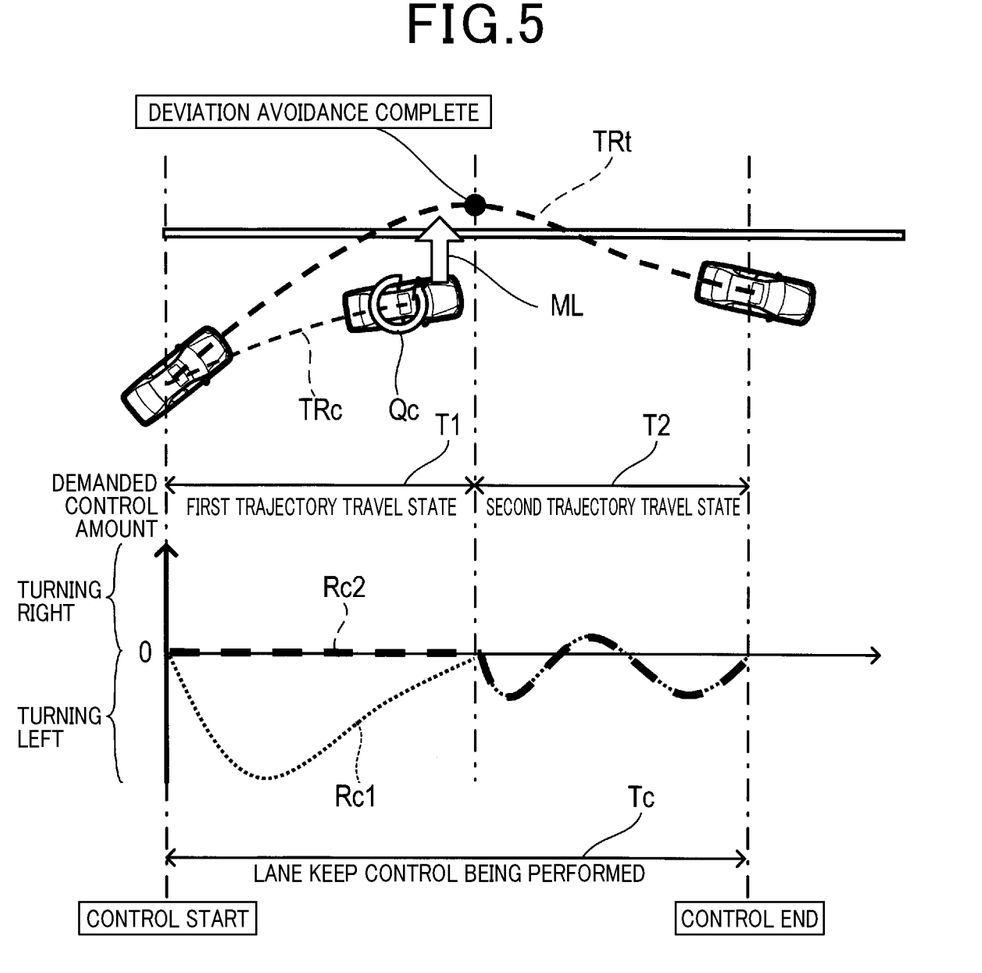
FIG. 5 is a view showing a relationship between a target trajectory, an actual trajectory, and a demanded control amount of the first embodiment.

When the own vehicle is in the first trajectory travel state (YES at S30), it is determined in S40 whether a demanded control amount causes steering of the own vehicle in the direction deviating from the driving lane. The demanded control amount is the demanded torque $\tau_{tgt}$ outputted from the second adder 28. Specifically, as shown in FIG. 5, for example, when the driver of the own vehicle steers the own vehicle to move to the right in order to avoid deviation while the own vehicle is moving to deviate to a left side of the driving lane, the own vehicle is located on the right of a target trajectory TRt (see an actual trajectory TRc in FIG. 5). In this case, in order to move the own vehicle to the left so that a travel trajectory of the own vehicle coincides with the target trajectory TRt (see an arrow ML in FIG. 5), the LKAECU 8 outputs a demanded control amount for turning the own vehicle to the left (see an arrow Qc and a demanded control amount Rc1 in FIG. 5). The demanded control amount at the time causes steering of the own vehicle in the direction deviating from the driving lane.

When the demanded control amount causes steering of the own vehicle in the direction deviating from the driving lane (YES at S40), in S50, the demanded control amount is set to zero (see a demanded control amount Rc2 in FIG. 5). Then, in S60, the demanded control amount set in S50 is outputted to the EPSECU 9, and this iteration of the output control process is terminated. Meanwhile, when the demanded control amount does not cause steering of the own vehicle in the direction deviating from the driving lane (NO at S40), control proceeds to S70. When it is determined in S30 that the own vehicle is not in the first trajectory travel state (NO at S30), control proceeds to S70.

When control proceeds to S70, the demanded torque $\tau_{tgt}$ outputted from the second adder 28 is outputted to the EPSECU 9 as the demanded control amount, and the output control process ends once.

According to the LKAECU 8 thus configured, the lane recognition section 21 recognizes the driving lane in which the own vehicle is traveling. The target trajectory generation section 22 generates the target trajectory in which the own vehicle travels so that deviation of the own vehicle from the recognized driving lane is suppressed. The feedforward steering angle calculation section 23, the feedback steering angle calculation section 24, the first adder 25, the feedforward torque calculation section 26, the feedback torque calculation section 27, and the second adder 28 calculate the demanded torque $\tau_{tgt}$ for controlling steering of the own vehicle so that the own vehicle travels along the generated target trajectory. When the own vehicle is in the first trajectory travel state where the direction of travel of the own vehicle is the direction deviating from the driving lane and the calculated demanded torque $\tau_{tgt}$ causes steering of the own vehicle in the direction deviating from the driving lane, the output control section 29 sets the demanded torque $\tau_{tgt}$ to zero which is a value which does not cause steering of the own vehicle in the direction deviating from the driving lane.

Thus, even in a situation where the driver of the own vehicle steers the own vehicle in a direction to avoid deviation from the driving lane and this causes the own vehicle to be located inside the target trajectory in the driving lane, the LKAECU 8 does not output the demanded torque $\tau_{tgt}$ which causes steering of the own vehicle in the direction deviating from the driving lane. This allows the LKAECU 8 to suppress the driver's anxiety that the own vehicle is automatically steered in the direction deviating from the driving lane. Thus, the LKAECU 8 can reduce the driver's anxiety when deviation from the driving lane is avoided.

As the value which does not cause steering of the own vehicle in the direction deviating from the driving lane, the output control section 29 of the LKAECU 8 sets zero which is a constant value. This allows the LKAECU 8 to simplify control for preventing steering of the own vehicle in the direction deviating from the driving lane.

According to the aforementioned embodiment, the LKAECU 8 is a lane keep assist device of the present invention. The lane recognition section 21 is travel lane recognition means of the present invention. The target trajectory generation section 22 is target trajectory setting means of the present invention.

The feedforward steering angle calculation section 23, the feedback steering angle calculation section 24, the first adder 25, the feedforward torque calculation section 26, the feedback torque calculation section 27, and the second adder 28 are control amount calculation means of the present invention. The output control section 29 is control amount setting means of the present invention.

The driving lane is a travel lane of the present invention. The demanded torque $\tau_{tgt}$ is an amount of steering control of the present invention.

Second Embodiment

The following description discusses a second embodiment of the present invention with reference to the drawings. In the second embodiment, components same as those of the first embodiment are given the same reference numerals and detailed descriptions of such components are omitted, and only differences from the first embodiment are described.

The travel assist system 1 of the second embodiment is the same as that of the first embodiment except that the output control process is changed.

The output control process of the second embodiment is the same as that of the first embodiment except that S55 is performed instead of S50.

Figure 6:
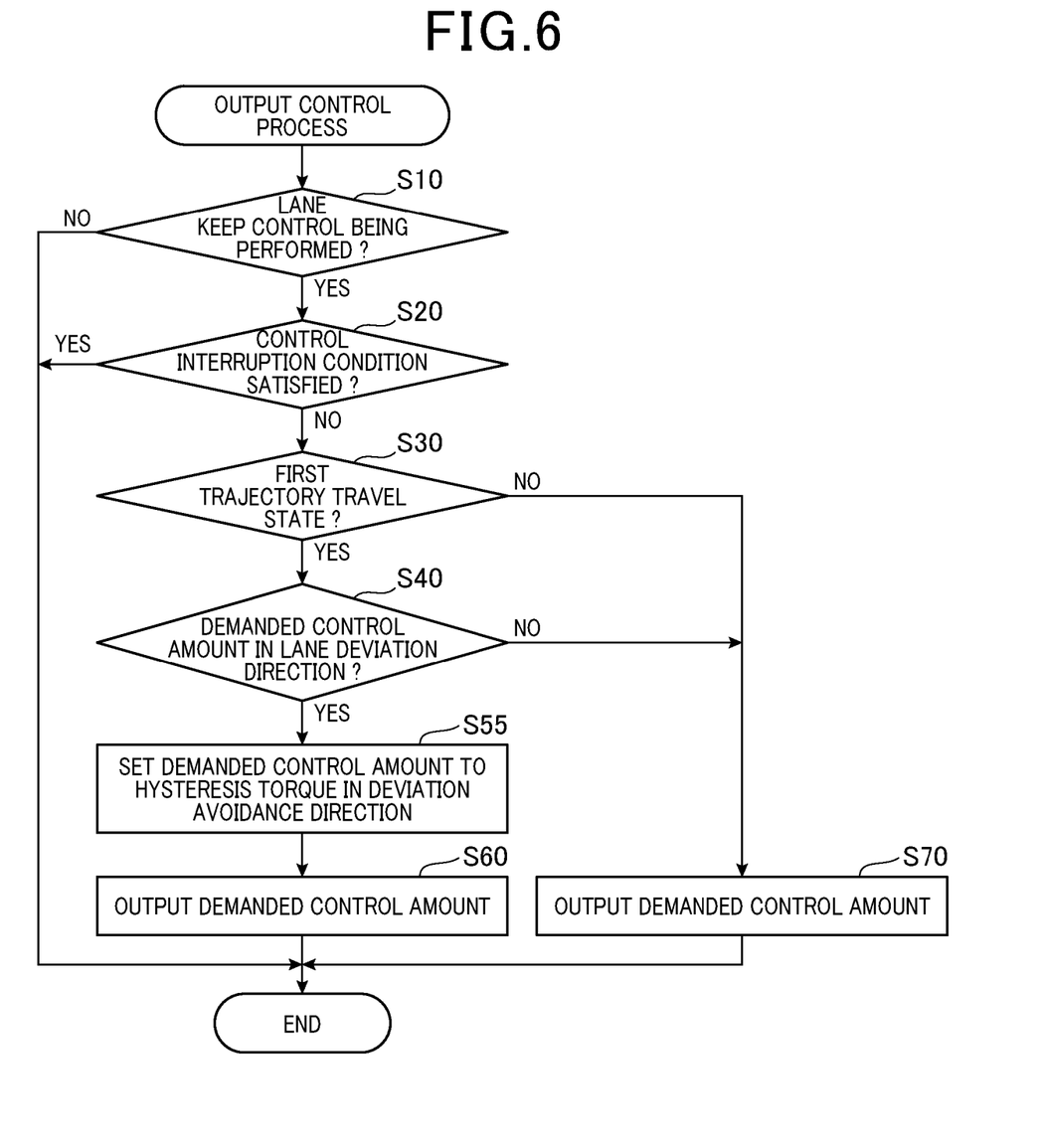
FIG. 6 is a flow chart showing an output control process of a second embodiment.
Figure 7:
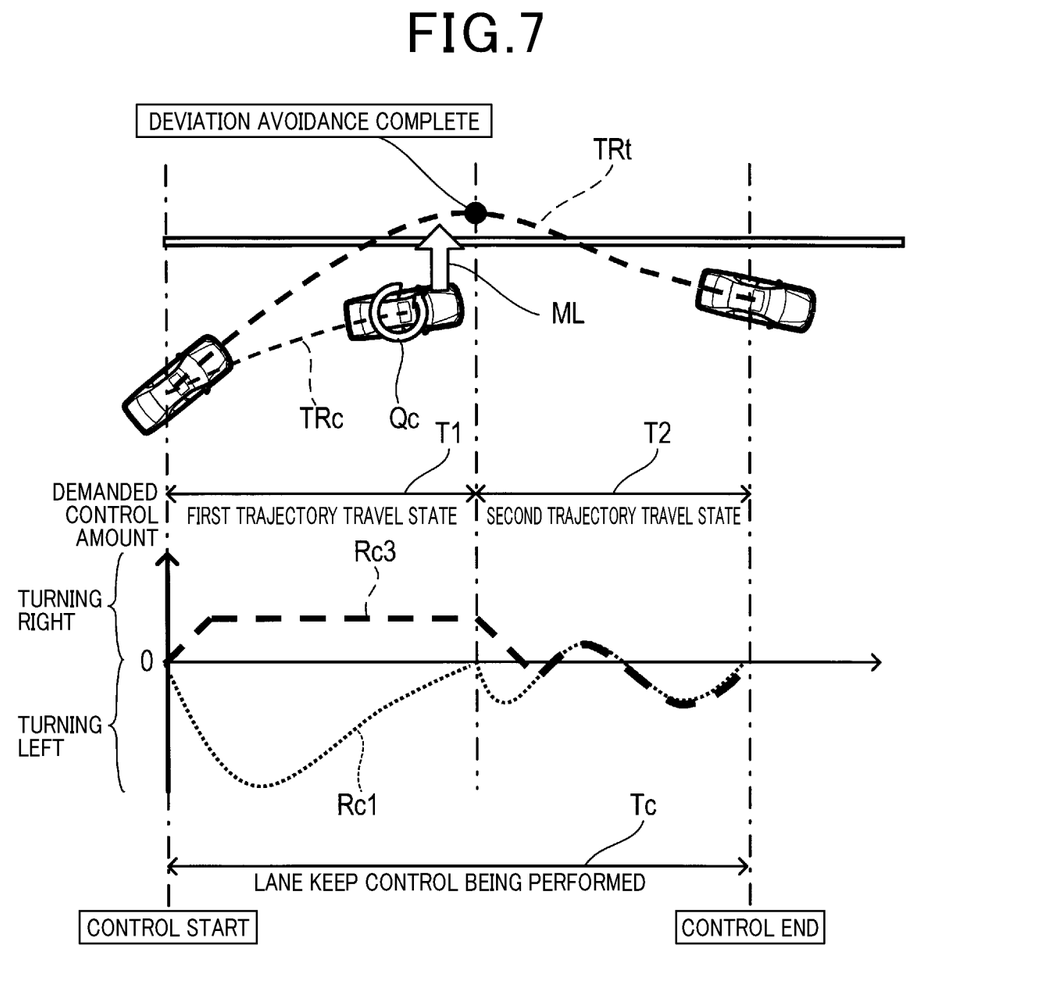
FIG. 7 is a view showing a relationship between a target trajectory, an actual trajectory, and a demanded control amount of the second embodiment.

That is, as shown in FIG. 6, when the demanded control amount causes steering of the own vehicle in the direction deviating from the driving lane (YES at S40), in S55, the demanded control amount is set to hysteresis torque Th (see a demanded control amount Rc3 in FIG. 7) in a deviation avoidance direction, and control proceeds to S60.

Figure 8:
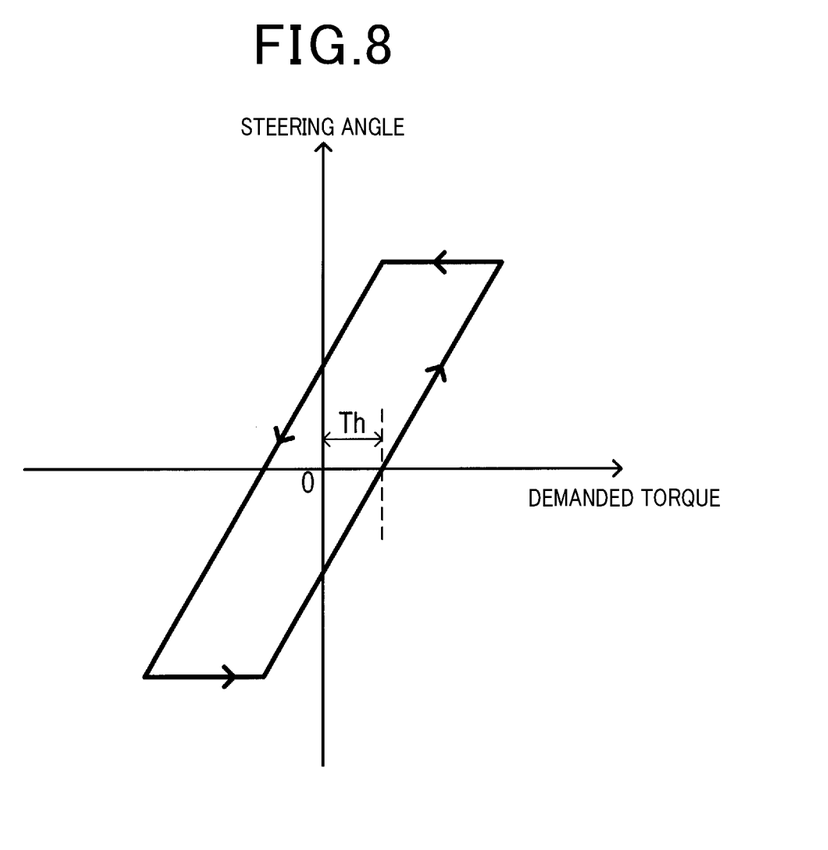
FIG. 8 is a hysteresis loop of a steering angle and demanded torque.

As shown in FIG. 8, the hysteresis torque Th is a maximum value of the demanded torque $\tau_{tgt}$ at which the steering angle is maintained at zero when the steering angle is zero. That is, when the demanded torque $\tau_{tgt}$ exceeds the hysteresis torque Th in the deviation avoidance direction, the own vehicle can be steered in the deviation avoidance direction.

Thus, as the constant value which does not cause steering of the own vehicle in the direction deviating from the driving lane, the output control section 29 of the LKAECU 8 sets the hysteresis torque Th which is the maximum value of the demanded torque $\tau_{tgt}$ at which the steering angle of the own vehicle is maintained at zero when the steering angle of the own vehicle is zero. Thus, when the driver of the own vehicle steers the own vehicle in a direction to avoid deviation from the driving lane, the own vehicle can promptly change the steering angle in the direction to avoid deviation from the driving lane.

In the aforementioned embodiment, the hysteresis torque Th is the maximum value of the amount of steering control of the present invention at which the steering angle is maintained at zero.

Although the embodiments of the present invention have been described above, the present invention is not limited to the aforementioned embodiments and can be implemented in various forms within the technical scope of the present invention.

Modified Example 1

For example, according to the aforementioned embodiments, the LKAECU 8 calculates the demanded torque $\tau_{tgt}$ and outputs the demanded torque $\tau_{tgt}$ to the EPSECU 9. However, the amount of steering control for controlling steering of the own vehicle is not limited to this.

Modified Example 2

According to the aforementioned embodiments, the demanded control amount is set to zero or to the hysteresis torque Th in the deviation avoidance direction. However, the configuration is not limited to this. For example, the demanded control amount can be set to torque that the driver does not feel, torque indicating the steering angle at the start of the lane keep control, or the like.

Furthermore, it is possible to distribute functions of a single component of the aforementioned embodiments as a plurality of components or integrate functions of a plurality of components into a single component. At least part of the configuration of the aforementioned embodiments can be substituted by a publicly known configuration having a similar function. A part of the configuration of the aforementioned embodiments can be omitted. At least part of the configuration of the aforementioned embodiments can be added to or substituted by another configuration of the aforementioned embodiments. Any aspect included in a technical idea specified only by text of the claims is an embodiment of the present invention.

REFERENCE SIGNS LIST

1 . . . Travel assist system
8 . . . LKAECU
21 . . . Lane recognition section
22 . . . Target trajectory generation section
23 . . . Feedforward steering angle calculation section
24 . . . Feedback steering angle calculation section
25 . . . Adder
26 . . . Feedforward torque calculation section
27 . . . Feedback torque calculation section
28 . . . Adder
29 . . . Output control section

The invention claimed is:

1. A lane keep assist device comprising:
   travel lane recognition means for recognizing a travel lane in which an own vehicle is traveling;
   target trajectory setting means for setting a target trajectory which is a trajectory in which the own vehicle travels so that deviation of the own vehicle from the travel lane recognized by the travel lane recognition means is suppressed;
   control amount calculation means for calculating an amount of steering control for controlling steering of the own vehicle so that the own vehicle travels along the target trajectory set by the target trajectory setting means; and
   control amount setting means for setting the amount of steering control to a deviation prohibition value which does not cause steering of the own vehicle in a direction deviating from the travel lane, in response to a direction of travel of the own vehicle being the direction deviating from the travel lane and the amount of steering control calculated by the control amount calculation means causes steering of the own vehicle in the direction deviating from the travel lane, wherein,
   the travel trajectory setting means outputs a lateral position, a lateral speed and a lateral acceleration, and
   the lateral speed of the own vehicle is a movement speed of the own vehicle along the direction perpendicular to the direction in which the travel lane extends.

2. The lane keep assist device as set forth in claim 1, wherein,
   the deviation prohibition value is a constant value which has been set in advance to be not less than zero.

3. The lane keep assist device as set forth in claim 2, wherein,
   the constant value is a maximum value of the amount of steering control at which a steering angle of the own vehicle is maintained at zero in response to the steering angle of the own vehicle being zero.

4. The lane keep assist device as set forth in claim 1, wherein,
   the control amount calculation means receives a feedback signal from the own vehicle.

5. The lane keep assist device as set forth in claim 1, wherein,
   the control amount calculation means calculates an amount of steering control for the own vehicle so that the own vehicle is controlled to follow the target trajectory within a predetermined change of direction of travel,
   the control amount setting means sets the amount of steering control to a deviation prohibition value that is different from the amount of steering control calculated by the control amount calculation means, and
   the deviation prohibition value causes the own vehicle to change its direction of travel promptly.

6. A lane keep assist device comprising:
   travel lane recognition means for recognizing a travel lane in which an own vehicle is traveling;
   target trajectory setting means for setting a target trajectory which is a trajectory in which the own vehicle travels so that deviation of the own vehicle from the travel lane recognized by the travel lane recognition means is suppressed;
   control amount calculation means for calculating an amount of steering control for controlling steering of the own vehicle so that the own vehicle travels along the target trajectory set by the target trajectory setting means; and
   control amount setting means for setting the amount of steering control to a deviation prohibition value which does not cause steering of the own vehicle in a direction deviating from the travel lane, in response to a direction of travel of the own vehicle being the direction deviating from the travel lane and the amount of steering control calculated by the control amount calculation means causes steering of the own vehicle in the direction deviating from the travel lane, wherein,
   the control amount calculation means comprises a steering angle section feeding a torque calculation section outputting a demanded torque.

7. The lane keep assist device as set forth in claim 6, wherein,
   the deviation prohibition value is a constant value which has been set in advance to be not less than zero.

8. The lane keep assist device as set forth in claim 7, wherein,
   the constant value is a maximum value of the amount of steering control at which a steering angle of the own vehicle is maintained at zero in response to the steering angle of the own vehicle being zero.

9. The lane keep assist device as set forth in claim 6, wherein,
   the control amount calculation means receives a feedback signal from the own vehicle.

10. The lane keep assist device as set forth in claim 6, wherein,
    the control amount calculation means calculates an amount of steering control for the own vehicle so that the own vehicle is controlled to follow the target trajectory within a predetermined change of direction of travel,
    the control amount setting means sets the amount of steering control to a deviation prohibition value that is different from the amount of steering control calculated by the control amount calculation means, and
    the deviation prohibition value causes the own vehicle to change its direction of travel promptly.

* * * * *